(12) United States Patent
Sankrithi

(10) Patent No.: US 7,052,441 B2
(45) Date of Patent: May 30, 2006

(54) SEATING AND TREADMILL EXERCISE DEVICE

(75) Inventor: Mithra M. K. V. Sankrithi, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 92 days.

(21) Appl. No.: 10/763,648

(22) Filed: Jan. 23, 2004

(65) Prior Publication Data

US 2004/0147374 A1 Jul. 29, 2004

Related U.S. Application Data

(62) Division of application No. 10/006,000, filed on Dec. 3, 2001.

(51) Int. Cl.
*A63B 22/02* (2006.01)

(52) U.S. Cl. ........................................................ 482/54

(58) Field of Classification Search .................. 482/51, 482/54, 148, 94–98
See application file for complete search history.

(56) References Cited

U.S. PATENT DOCUMENTS

| | | | | |
|---|---|---|---|---|
| 4,066,257 A | * | 1/1978 | Moller | 482/54 |
| 4,679,787 A | * | 7/1987 | Guilbault | 482/54 |
| 5,496,247 A | * | 3/1996 | Anderson | 482/142 |
| 5,830,113 A | * | 11/1998 | Coody et al. | 482/54 |
| 6,331,153 B1 | * | 12/2001 | McClellan | 482/52 |
| 6,458,060 B1 | * | 10/2002 | Watterson et al. | 482/54 |

* cited by examiner

*Primary Examiner*—Stephen R. Crow
(74) *Attorney, Agent, or Firm*—Alston & Bird LLP

(57) ABSTRACT

A seating and treadmill exercise device for passengers to exercise on an aircraft, capable of being displaced between stowed and deployed positions. While passengers board the aircraft, the seating and treadmill exercise device may be placed in the stowed position to allow passengers to freely move about the aircraft cabin. A folding seat is attached to the underside of the treadmill track, providing a seat for an airline attendant when the aircraft is taxiing and taking off, or landing. While the aircraft is in route, on long distance flights, the seating and treadmill exercise device may be placed in the deployed position so that passengers are able to exercise and stretch their legs, thus enhancing passenger well-being and health and helping to prevent maladies associated with long periods of sitting such as Deep Vein Thrombosis.

12 Claims, 7 Drawing Sheets

SEATING AND TREADMILL EXERCISE DEVICE

CROSS-REFERENCE TO RELATED APPLICATIONS

This application is a divisional of U.S. application Ser. No. 10/006,000, filed Dec. 3, 2001, which is hereby incorporated herein in its entirety by reference.

FIELD OF THE INVENTION

The present invention relates to treadmill exercise devices and, more particularly, a seating and treadmill exercise device for an aircraft that includes a folding seat which may be utilized when the treadmill is stored, such as during the takeoff and landing phases of flight.

BACKGROUND OF THE INVENTION

As international and other extended flights become more prevalent, and airlines continue to add long-distance, non-stop international flights to their schedules, more attention has been paid to maladies, such as Deep Vein Thrombosis (a.k.a. "Economy Class Syndrome"), which may be exacerbated by extended periods of sitting.

Long periods of sitting can put uncomfortable pressure on the lower back muscles and restrict blood flow to and from the legs. The restriction of blood flow in the legs can cause the blood to pool and clot. The formation of these blood clots in the large veins in the legs caused by restricted blood flow is called Deep Vein Thrombosis (DVT). Blood clots can be extremely dangerous if they break off and travel to the lungs or more rarely the brain. Symptoms of DVT include pain or tenderness in the legs, swelling, discoloration and joint pain. Low impact exercises such as walking could help prevent the formation of this condition, but space on aircraft is limited, and airlines generally prefer to utilize as much space as possible for passenger seating and legroom.

Although exercise is the best preventative measure for these types of conditions, aircraft cabins do not lend themselves well to a great deal of movement. Lengthwise extending aisles and cross aisles are generally narrow, only allowing for one passenger at a time to freely move about. The ability to use aisles for walking exercise is further inhibited by congestion in these aisles from flight attendants with galley service carts, and from passengers in queue for lavatories. Commercial aircraft have largely been designed in this particular manner to allow for as much passenger seating as possible, to ensure that more customers can be served and more people are able to reach their destinations quickly, efficiently, and economically.

One solution to this problem is to encourage passengers to move and stretch during the flight, utilizing any free space they may find. This type of movement would help to stretch the muscles in the leg, would provide general cardiovascular benefits, and would most likely be effective in relieving and preventing blood clots. Unfortunately, however, the long distance flights where this type of exercise could be most beneficial serve a large number of people, making it difficult if not impossible for everyone to move about the cabin and stretch their legs. There is simply not enough room for all passengers to exercise, while still allowing for the inevitable meal service activities, bathroom breaks, luggage shuffling and conversations with other passengers.

For these reasons it would be desirable to provide some means for facilitating exercise by the passenger while minimizing use of precious cabin space. Thus, significant benefits to the health and well-being of passengers could be provided.

SUMMARY OF THE INVENTION

An interior assembly, such as for an aircraft, is therefore provided that includes a combined seating and treadmill exercise device. As a result of the design of the seating and treadmill exercise device, a treadmill track is capable of being moved between stored and deployed positions to permit exercise while in the deployed position while allowing for more cabin space when the treadmill is in the stored position. In addition, a folding seat is structurally connected to the treadmill, providing seating for airline attendants when the treadmill is in the stored position, as during the takeoff and landing phases of flight.

According to the present invention, a seating and treadmill exercise device is therefore provided that includes a treadmill track which is typically structurally connected to a floor or wall structure in an aircraft while allowing movement between stowed and deployed positions. The seating and treadmill exercise device also includes an attached folding seat. Advantageously, when the treadmill track is not in the deployed position and in use by a passenger, the treadmill track may be put in the stowed position and the folding seat utilized by an airline attendant. In this regard, the folding seat may be sized to accommodate a pair of occupants side-by-side.

The folding seat generally includes at least one chair back, and at least one chair seat capable of being moved between folded and unfolded positions. The folding seat would generally be in the folded position while the treadmill track is in the deployed position, and may be in either the folded or unfolded positions when the treadmill track is in the stowed position. The chair seat may be attached with a hinge such that the chair seat is held close to the treadmill track when the folding seat is in the folded position. In the preferred embodiment, the folding seat includes safety restraints, such as a seat belt, a seat belt plus shoulder belt, or 3-, 4-, or 5-point harness restraints.

In one preferred embodiment, the seating and treadmill exercise device also includes a treadmill motor capable of driving the moveable, endless loop surface of the treadmill track. The seating and treadmill exercise device may also include at least one handhold for the treadmill track user and treadmill controls for operating the treadmill including on-off controls, speed controls and the like. In one embodiment, the treadmill controls include means for accepting payment in exchange for use of the treadmill and/or means for limiting the time during which an individual may use the treadmill track. The seating and treadmill exercise device is preferably rotated about an axis substantially proximate a wall in order to move between the stowed and deployed positions. The seating and treadmill exercise device will generally have a securing device for firmly attaching the seating and treadmill exercise device to a wall when the seating and treadmill exercise device is in the stowed position. The seating and treadmill exercise device may optionally have a securing device for firmly attaching the seating and treadmill exercise device to the floor when the seating and exercise device is in the deployed position.

In one preferred embodiment, the seating and treadmill exercise device is a portion of the interior assembly of an aircraft. In addition to the seating and treadmill exercise device, the interior assembly will include a structure fixed in position within the aircraft cabin. The structure includes at least one wall defining a region of the aircraft, and may be, for example, a partition or a wall of a lavatory, galley or fixed closet. The interior assembly may also include a rigid or flexible divider, such as a curtain, for separating the seating and treadmill exercise device from the rest of the aircraft cabin, particularly when the treadmill track is in the deployed position.

Accordingly, the seating and treadmill exercise device of the present invention allows passengers to exercise during flight and therefore provide health benefits and help avoid maladies such as Deep Vein Thrombosis. Additionally, permitting the treadmill track to be stored when not in use and utilizing the attached folding seat for airline attendant seating maximizes cabin space. The space that would otherwise be filled by the deployed treadmill track may then be used by passengers and crew members to freely move about the aircraft cabin, and can also be used as an emergency evacuation cross-aisle when the aircraft is on the ground.

BRIEF DESCRIPTION OF THE DRAWINGS

Figure 1:
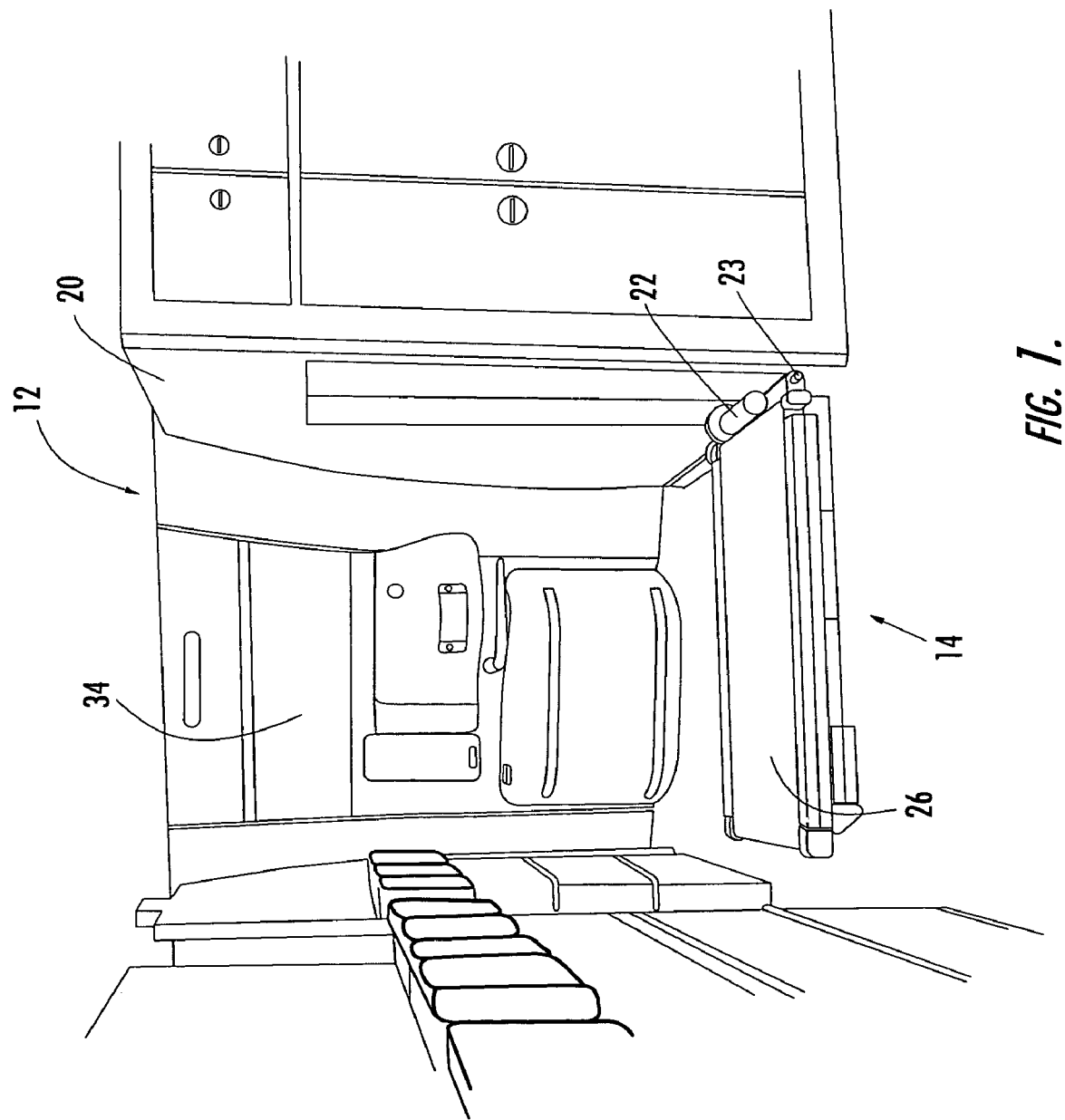
Figure 2:
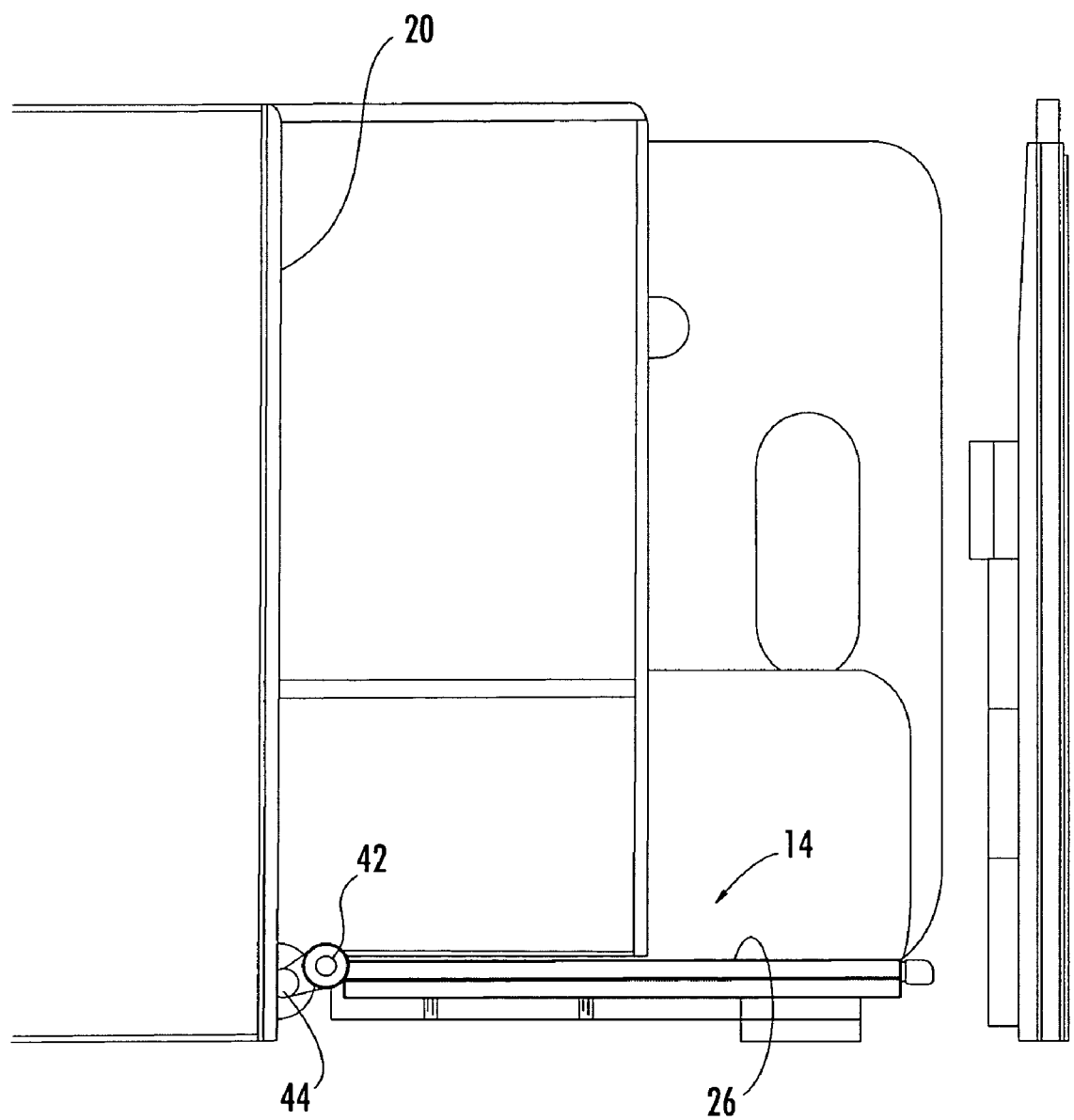
Figure 3:
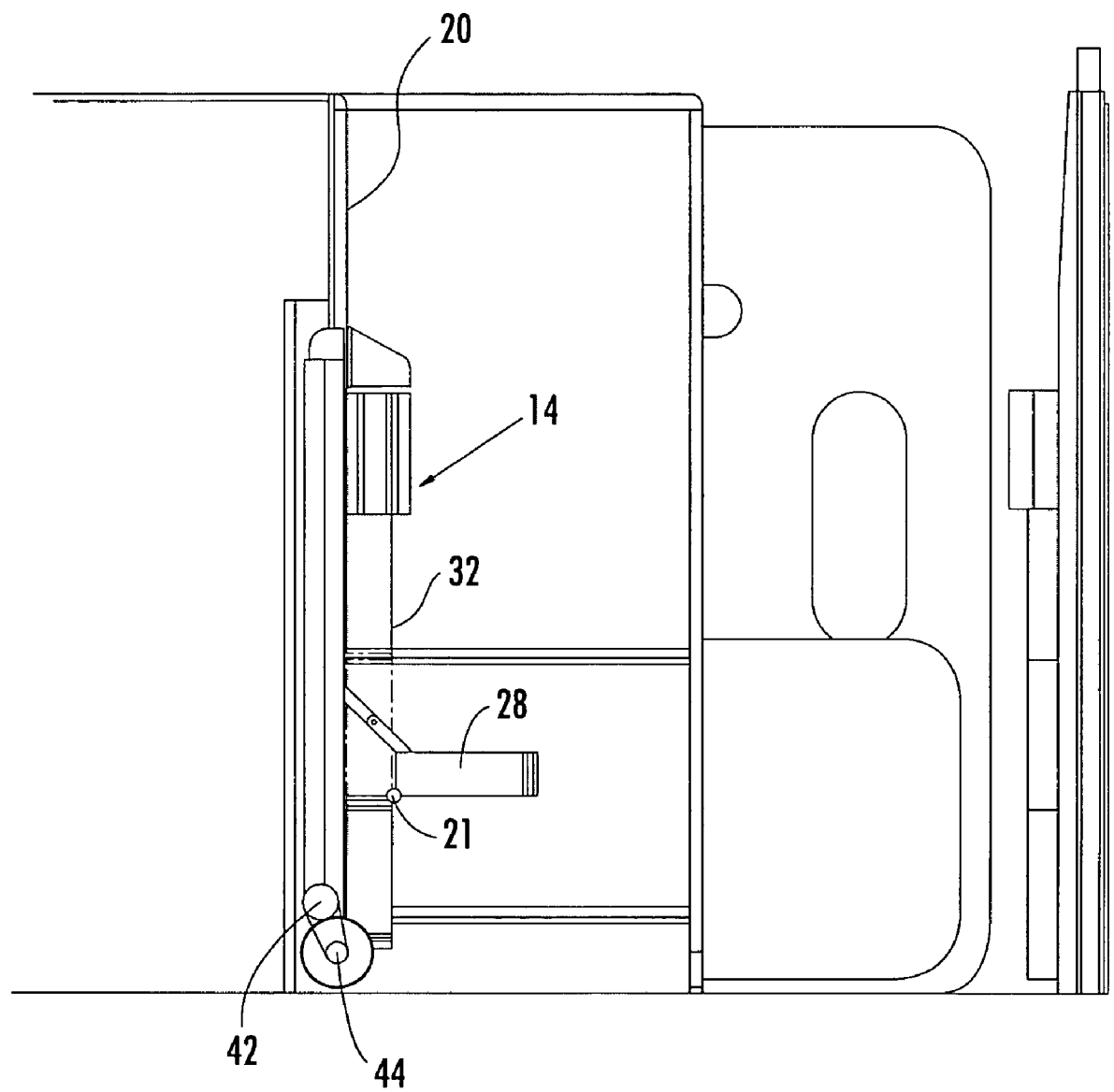
Figure 4:
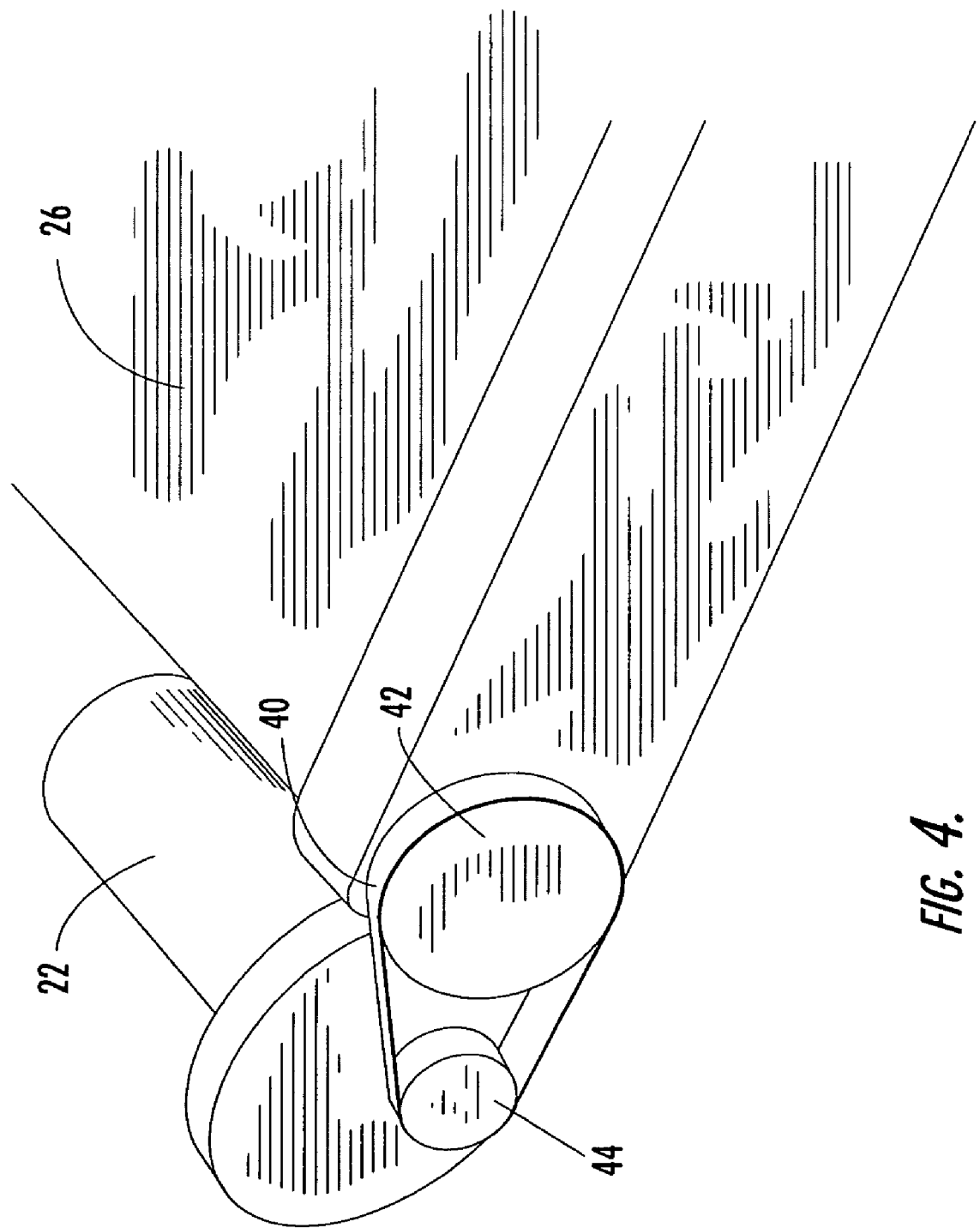
Figure 5:
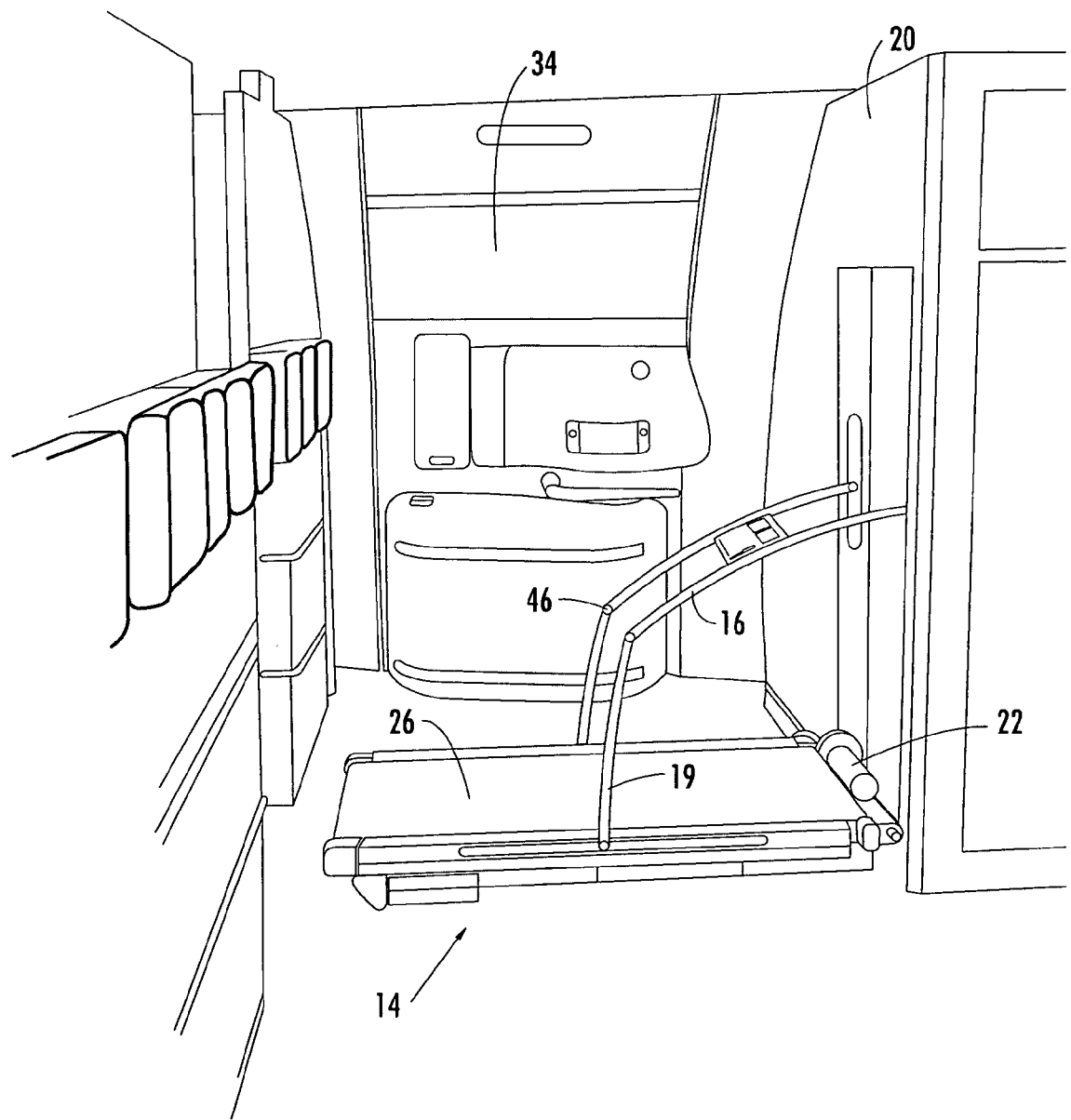
Figure 6:
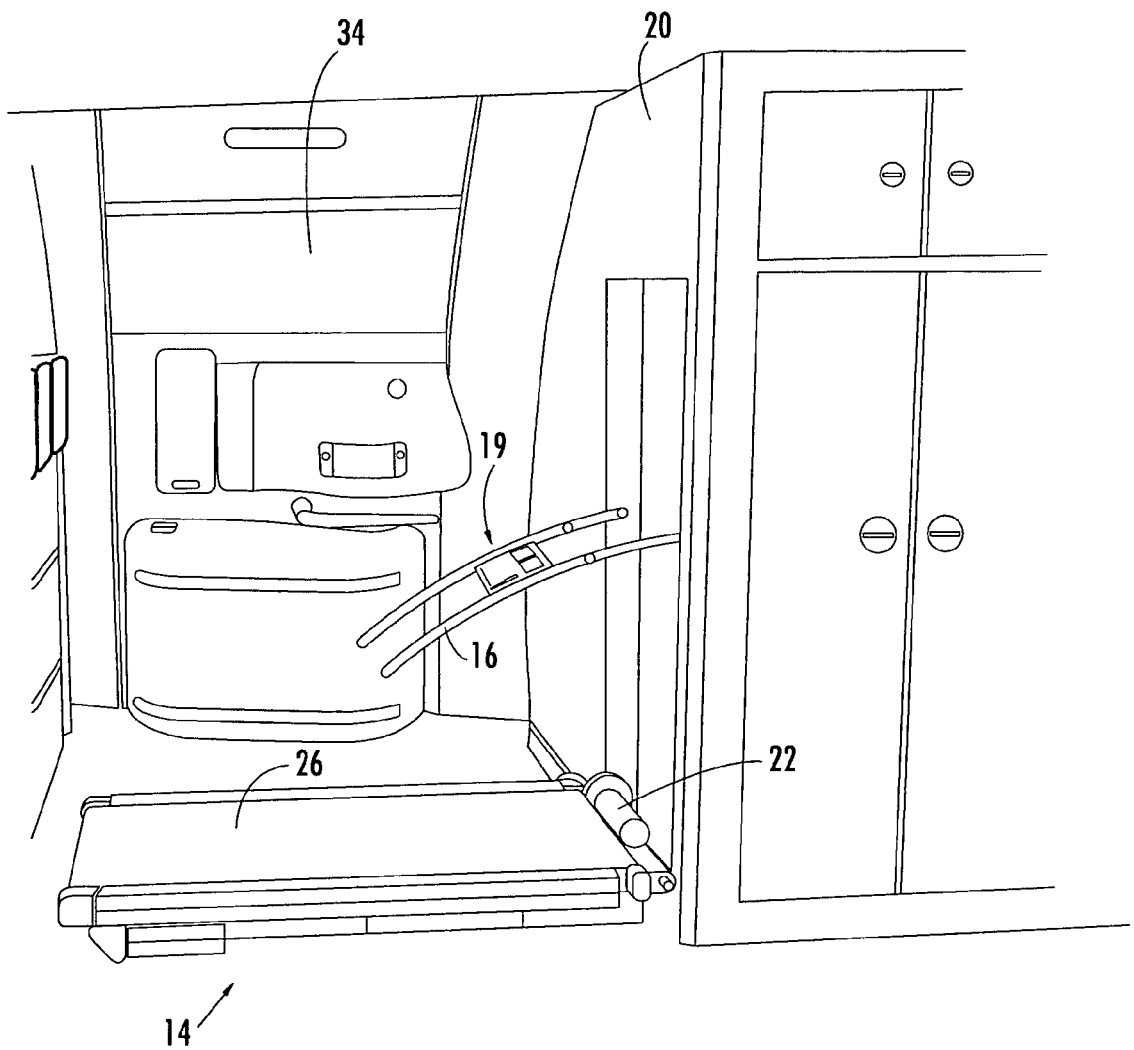
Figure 7:
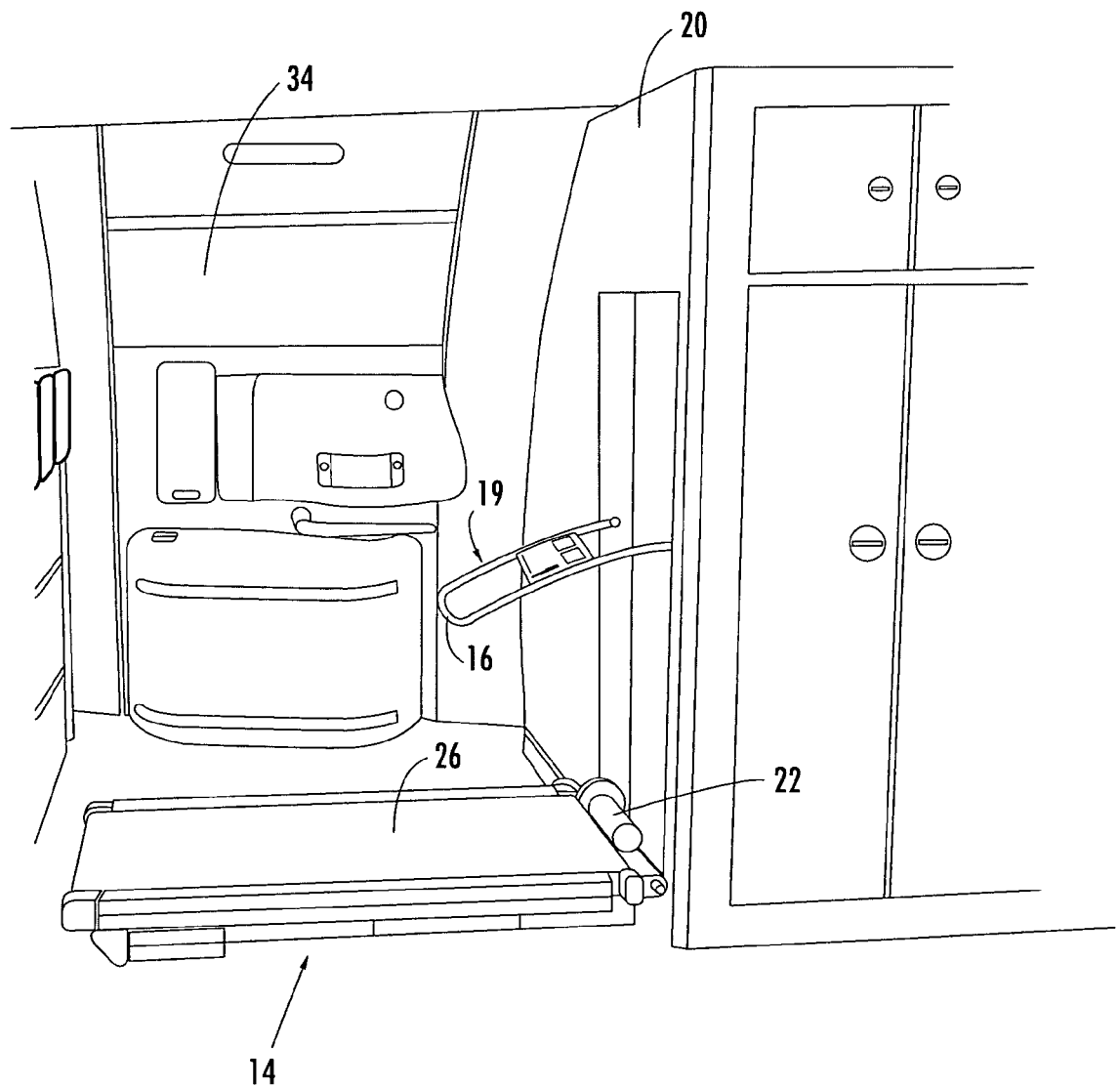

Having thus described the invention in general terms, reference will now be made to the accompanying drawings, which are not necessarily drawn to scale, and wherein:

FIG. 1 is a perspective view of an aircraft seating and treadmill exercise device in the deployed position according to an embodiment of the present invention;

FIG. 2 is a side view of the aircraft seating and treadmill exercise device of FIG. 1 in the deployed position;

FIG. 3 is a side view of an aircraft seating and treadmill exercise device in the stored position according to an embodiment of the present invention which includes a chair seat in the unfolded position;

FIG. 4 is a fragmentary perspective view of a portion of the aircraft seating and treadmill exercise device of FIGS. 1 and 2 depicting a motor for driving the treadmill track; and FIGS. 5–7 are perspective views of alternative embodiments of the aircraft seating and treadmill exercise device of the present invention having different types of handholds.

DETAILED DESCRIPTION OF THE INVENTION

Various embodiments of the invention are set forth below. While the invention is described with reference to specific embodiments, it will be understood that the invention is not intended to be so limited. To the contrary, the invention includes numerous alternatives, modifications and equivalents as will become apparent from consideration of the present specification including the drawings, and as defined in the claims.

Referring to a preferred embodiment shown in FIGS. 1 and 2, a seating and treadmill exercise device 14 for use on board an aircraft is illustrated. In the illustrated embodiment, the seating and treadmill device 14 is located within a portion of the cabin 12 of an aircraft. Although the seating and treadmill exercise device may be located at various positions within an aircraft, the seating and treadmill exercise device 14 is typically located in the vicinity of the area where fold-away seats are usually provided for the flight attendants in a cross-aisle area adjacent to a cabin exit door. As such, the seating and treadmill exercise device 14 is depicted to be located proximate a wall 20, as, for example, a partition or a wall of a fixed structure such as a galley, lavatory, fixed closet or the like, and in a preferred embodiment also proximate to a door 34 that may be used to enter or exit the aircraft. The door 34 is located at the end of a cross aisle which extends from a lengthwise extending aisle to the aircraft door 34.

According to the present invention, the portion of the cabin 12 also includes a seating and treadmill exercise device 14 which is capable of moving between a deployed position as shown in FIGS. 1 and 2 and a stored position as shown in FIG. 3. When the seating and treadmill exercise device 14 is in the stored position, it is folded compactly and firmly attached to a wall or other fixed structure in the aircraft by a securing device, such as a latch, clamp, hook, bolt or the like. Advantageously, when the seating and treadmill exercise device 14 is in the stored position, the cross aisle is open, and passengers are free to exit and enter the aircraft through the door 34 for boarding, deplaning, and/or emergency evacuation purposes. Thus, the seating and treadmill exercise device 14 is typically folded into the stored position during boarding and disembarking from the aircraft, and in general when the aircraft is on the ground.

Attached to one side of the seating and treadmill exercise device 14 is a folding chair that includes a chair seat 28 shown in the unfolded position in FIG. 3. The folding chair may also include a chair back 32 affixed to this same side of the seating and treadmill exercise device 14. While the chair back 32 is fixed in position, the chair seat generally includes a hinge 21 that allows the chair seat to be folded upwardly and to be disposed proximate to this side (the underside) of the treadmill track 26 when it is not in use. Also attached to this side of the seating and treadmill exercise device 14 is a safety restraint, such as a seat belt, a seatbelt plus shoulder belt or a 3-, 4- or 5-point harness restraint, that may be utilized by someone sitting in the folding chair during flight or ground operations, e.g., by attendants during the takeoff and landing phases of flight. When people are boarding or disembarking from the aircraft, the seating and treadmill exercise device 14 is generally placed in the stored position, and the chair seat 28 in the folded position to allow movement in the cross aisle. When the aircraft is in flight and the seating and treadmill exercise device 14 is not in use, such as during takeoff and landing or when the aircraft encounters turbulence, the chair seat 28 may be unfolded to provide a seat for one or more airline attendants. Thus, the seating and treadmill exercise device 14 may replace a conventional attendant seat so as not to further crowd the cabin.

The seating and treadmill exercise device 14 may be displaced to a deployed position as shown in FIGS. 1 and 2 during flight in order to allow passengers to stretch their legs and exercise and so obtain the health and well-being benefits of low-impact aerobic exercise by walking on the treadmill. In this regard, the seating and treadmill exercise device 14 includes a treadmill track 26 that folds downwardly from the wall once the securing device is released. The treadmill track 26 includes a frame, typically formed of metal or composite materials, which carries at least a pair of rollers about which an endless belt extends for providing a surface upon which a passenger can walk, run or the like. While the surface which supports the passenger may have different sizes depending upon the design, the treadmill track of one embodiment provides a surface of about 18 inches by 50 inches for supporting the passenger. According to the present invention, the frame is generally attached to the wall or other fixed structure and the treadmill track is pivotally connected thereto so as to pivot about a pivot point 23. FIG. 5 illustrates an embodiment of the seating and treadmill exercise device 14 which includes an upwardly extending frame 19 connected to the frame of the treadmill track, that supports handholds 16 that may be grasped during exercise.

As shown in FIGS. 5–7, the treadmill may include various types of handles. Depending upon the type of handle, the handle may fold up in different fashions to permit the treadmill to be moved to a stored position. As shown in FIG. 5, for example, the handle is slidably connected to the frame of the treadmill track and the wall to which the treadmill is mounted to permit the handle to be collapsed at a hinge point 46 as the treadmill is folded upwardly toward the wall. In contrast, the handles depicted in FIGS. 6 and 7 are shown to fold downwardly and upwardly, respectively, as the treadmill is folded upwardly toward the wall. These and other handle arrangements known from the prior art, can be used within the spirit and scope of the invention.

In order to facilitate movement of the endless belt, the seating and treadmill exercise device 14 can also include a motor 22 as shown in FIG. 4 for driving the endless belt and, more particularly the rollers about which the endless belt extends. While the treadmill may have motors of many different sizes, a typical motor would be about 2.5 horsepower and, in one embodiment, a 2.5 horsepower DC motor that operates at 18 amps, 6700 rpm and 130 VDC. As shown in FIG. 4, in order to drive the endless belt, a drive belt 40 may extend about a belt pulley 42 that is connected to one end of a roller as well as a drive pulley 44 that is driven by the motor so as to rotate the drive belt which rotates the belt pulley and, in turn, the endless belt. This or other drive mechanisms known from the prior art may be used for powered treadmill embodiments.

In addition, the seating and treadmill exercise device 14 can include a control panel 48 with an associated display for providing information relating to speed, elapsed time, calories, etc. to the person exercising. If treadmill use is to be controlled by payment or time (depending on airline preferences), the seating and treadmill exercise device and, most commonly, the control panel, may include means for securing payment for use of the treadmill, such as a slot for accepting bills and/or coins utilized to pay for usage of the treadmill or a card reader for accepting and reading a credit card, frequent flier card or the like that is utilized by the passenger to pay for use of the treadmill, and/or a timer or other type of alarm for limiting the time during which a passenger can utilize the treadmill. Moreover, the control panel can also permit input by the person exercising regarding the speed at which the motor drives the endless belt, the incline of the endless belt and the like. As such, the seating and treadmill exercise device 14 also includes a controller that operates in conjunction with the control panel to compute the various parameters and correspondingly drive the display(s). In addition, the controller is preferably adapted to provide control signals to the motor based upon input received via the control panel. In embodiments in which treadmill usage is controlled by payment and/or time, the controller also insures that payment has been received and/or enforces the time limits. For nonmotorized treadmill variants, the control panel may include means to adjust the frictional resistance of the treadmill bolt. The display(s) may show data, such as time or distance, and may optionally be used for entertainment or advertising purposes.

As shown in FIGS. 1 and 2, the seat back 32 and seat chair 28 in the folded position are located under the seating and treadmill exercise device 14, between the treadmill track 26 and the floor 24 of the aircraft cabin 12. The treadmill track 26 of the seating and treadmill exercise device 14 may also be firmly attached to the floor 24 of the cabin by a securing device, such as a latch, clamp, hook, bolt or the like. Although not necessary for the practice of the present invention, a passenger may exercise in some degree of privacy by using a curtain or other flexible or rigid, deployable or fixed divider for separating the seating and treadmill exercise device 14 from the rest of the aircraft cabin.

While passengers are boarding the aircraft, the seating and treadmill exercise device 14 is generally in the stored position and the chair seat 28 in the folded position to allow movement through the cross aisle and door 34. While the aircraft taxis and during takeoff the seating and treadmill exercise device 14 would typically remain in the stored position, and the seat chair 28 would preferably be in the unfolded position to provide a seat for an airline attendant. When the aircraft is in route the seating and treadmill exercise device 14 may be deployed and passengers may use the treadmill track 26 to stretch their legs and increase circulation. When the aircraft is preparing to land, however, the seating and treadmill exercise device 14 will preferably be returned to the stored position and the chair seat 28 to the unfolded position to again provide a seat for an airline attendant as illustrated in FIG. 3. This configuration may also be used in flight phases when the "fasten seat belts" sign is turned on. Once the aircraft has landed, the chair seat 28 may be placed in the folded position to give an unobstructed cross aisle, which may be used by passengers to exit and enter the plane, or for emergency evacuation purposes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An interior assembly for an aircraft comprising:
   a structure fixed in position within an aircraft cabin, said structure comprising at least one wall defining a region of the aircraft cabin;
   a combined seating and treadmill exercise device disposed proximate to said structure, said combined seating and treadmill exercise device comprising a treadmill track that is capable of being moved between a stowed position and a deployed position, wherein said seating and treadmill exercise device is structurally attached to at least one of said structure and a floor of the aircraft cabin and allowed movement between stowed and deployed positions, wherein said treadmill track comprises a moveable surface for supporting a person; and
   a folding seat structurally connected to said treadmill track and moveable therewith for enabling a person to sit thereon when said treadmill track is in the stowed position.

2. An interior assembly according to claim 1 wherein said structure is at least one of a galley, lavatory and a fixed closet.

3. An interior assembly according to claim 1 wherein said folding seat consists of at least one chair back and at least one chair seat capable of being moved between folded and unfolded positions.

4. An interior assembly according to claim 1 wherein said folding seat is sized to accommodate two persons side-by-side.

5. An interior assembly according to claim 1 further comprising a hinge attaching said folding seat to an underside of said treadmill track so that the folding seat is held proximate to an underside of said treadmill track when said treadmill track is in the deployed and stowed positions.

6. An interior assembly according to claim 1 wherein said folding seat further comprises safety restraints.

7. An interior assembly according to claim 1 further comprising a treadmill motor capable of driving the treadmill track and wherein the moveable surface of the treadmill track comprises an endless loop surface for supporting a person during exercise.

8. An interior assembly according to claim 1 further comprising at least one handhold for the treadmill track user.

9. An interior assembly according to claim 1 further comprising treadmill controls operable by the treadmill track user.

10. An interior assembly according to claim 1 further comprising a divider for separating the area filled by said treadmill in the deployed position and the rest of the aircraft cabin.

11. An interior assembly according to claim 1 wherein said seating and treadmill exercise device is displaced about an axis proximate the wall in order to move between the deployed and stowed positions.

12. An interior assembly according to claim 1 further comprising a securing device for firmly attaching said seating and treadmill device to the wall of said structure when said seating and treadmill exercise device is in the stowed position.

* * * * *